United States Patent [19]

Donato

[11] 4,096,349

[45] Jun. 20, 1978

[54] FLEXIBLE CONNECTOR FOR TRACK LIGHTING SYSTEMS

[75] Inventor: Anthony C. Donato, Westfield, N.J.

[73] Assignee: Lightolier Incorporated, Jersey City, N.J.

[21] Appl. No.: 784,136

[22] Filed: Apr. 4, 1977

[51] Int. Cl.[2] .......................... H02G 3/04; H02G 3/06
[52] U.S. Cl. .................................... 174/68 R; 174/48;
174/86; 339/4
[58] Field of Search ..................... 174/68 R, 68 C, 86,
174/70 C, 72 C, 48; 339/4, 22 B

[56] References Cited

U.S. PATENT DOCUMENTS 2,305,100  12/1942  O'Brien ........................... 174/86 X

*Primary Examiner*—Thomas J. Kozma
*Attorney, Agent, or Firm*—Arthur B. Colvin

[57] ABSTRACT

A flexible connector is disclosed for electrically and mechanically connecting the ends of diverging light tracks, the connector being characterized by its ability to be deformed or bent in any of a series of directions normal to the axis thereof and to maintain itself in said bent or deformed condition.

3 Claims, 5 Drawing Figures

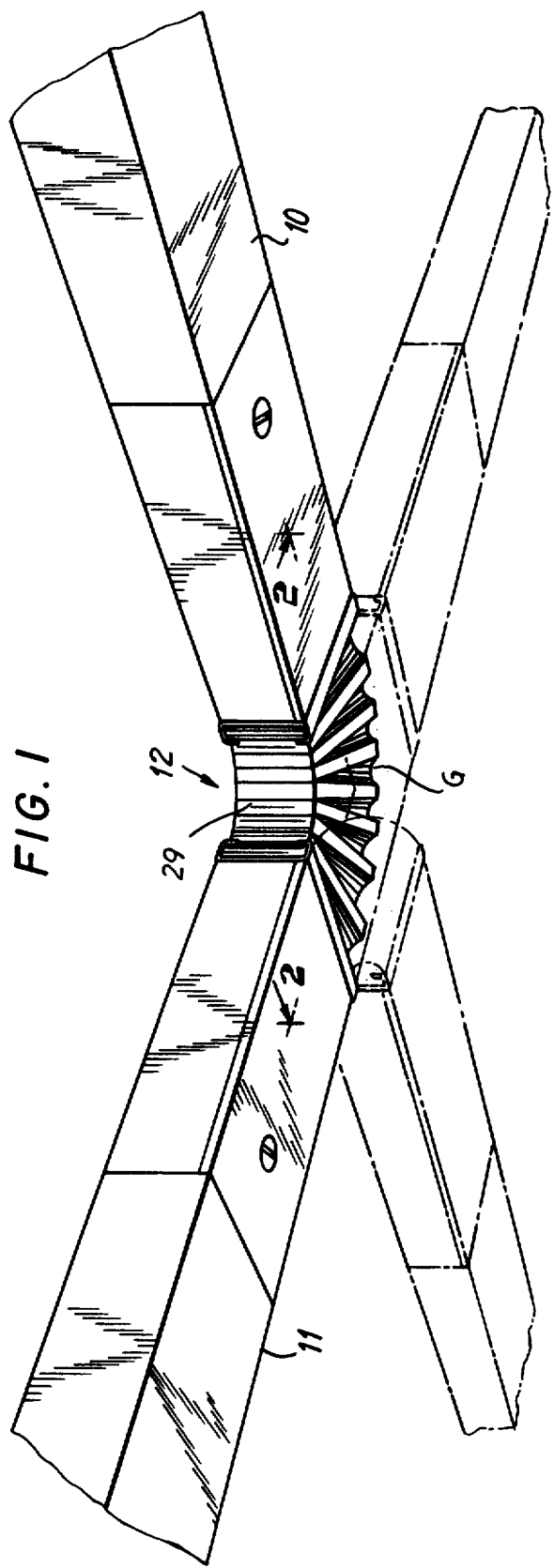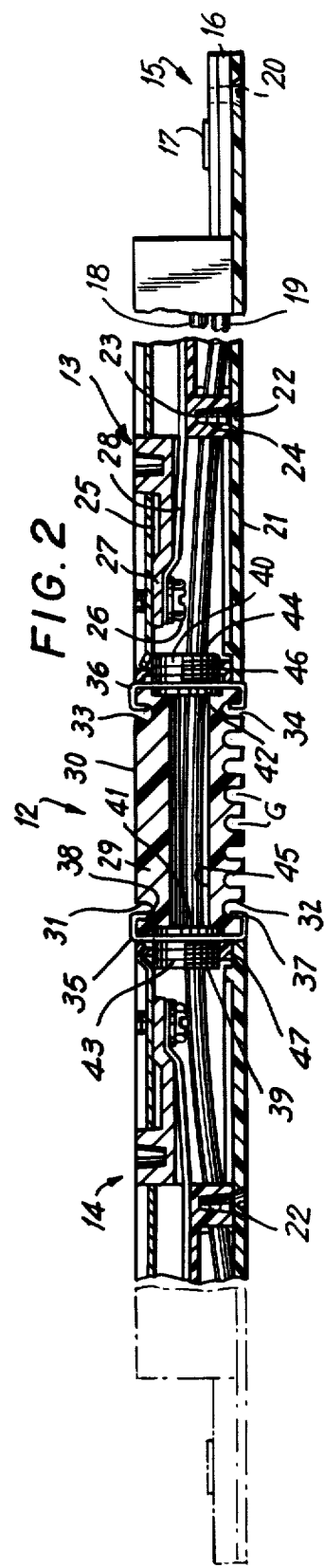

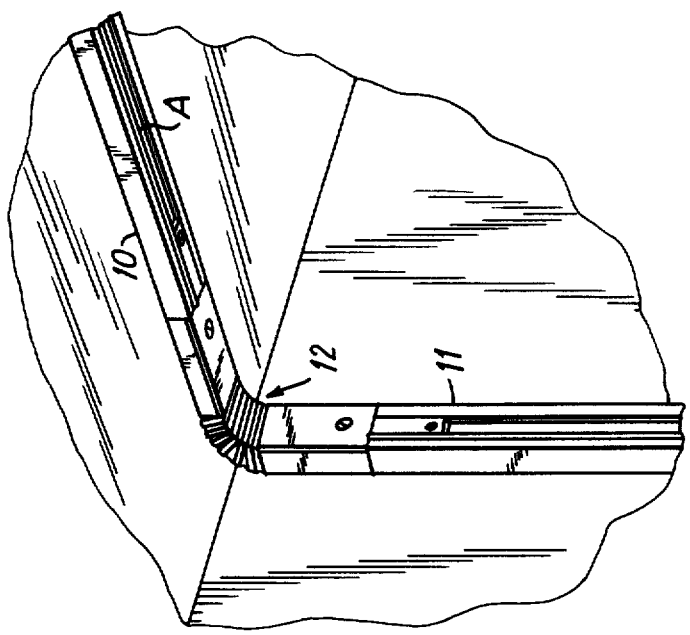
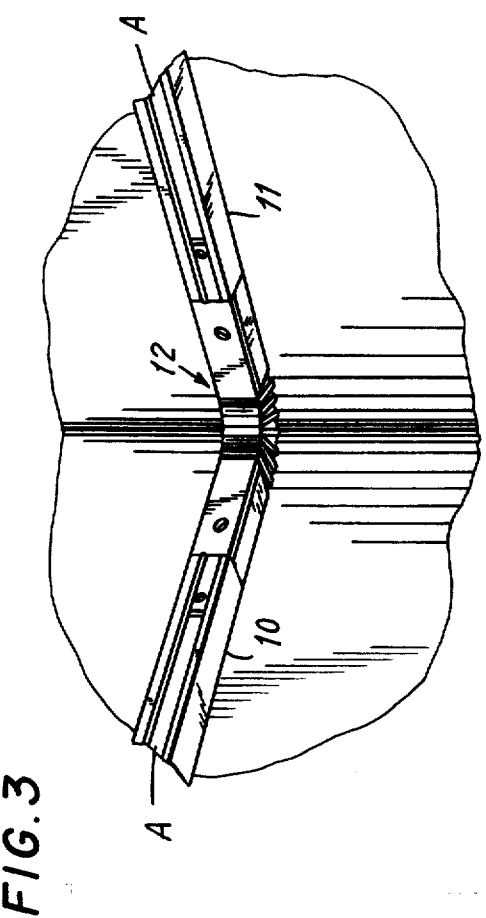
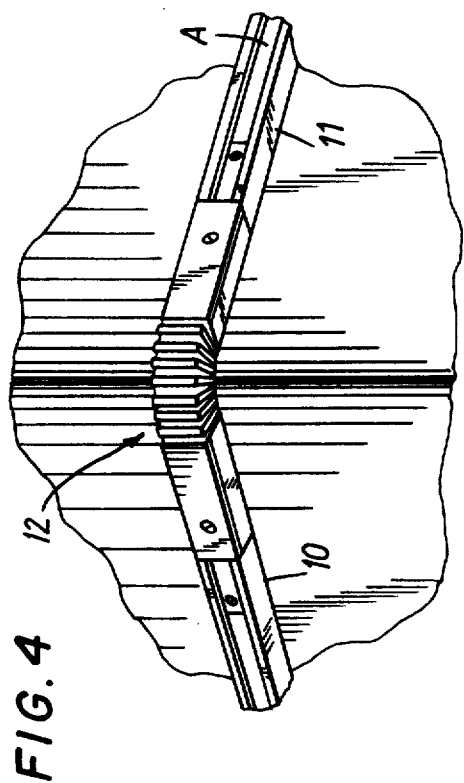

FLEXIBLE CONNECTOR FOR TRACK LIGHTING SYSTEMS

The present invention is in the field of track lighting devices, and more particularly devices of the type which comprise extended conduits providing access at any selected position along the length thereof for the attachment of appliances, such as spotlights or the like.

It is known, as shown by way of example in United States Pat. Nos. 3,246,074, 3,286,052 and 3,295,093, to provide an electrical conduit construction wherein an elongated carrier member supports electrical conduits in recessed condition therewithin. In devices of the type described, lights, tapping plugs or similar fixtures are adapted to be mechanically and electrically connected to the track in any position longitudinally therealong.

In a typical track installation of the type described, the track is supported from the ceiling and a connection is effected between the conduits in the track and mains lines in a junction box.

It has been found desirable to extend the use of track lighting installations beyond mere ceiling uses. Thus, special and pleasing effects may be derived by running a track along a ceiling and down an adjacent wall or along the junction along two adjacent walls and the ceiling.

Heretofore, installations of the type described, e.g. where tracks bear an angular relationship to each other, have required the use of a junction fixture which holds the two rigid track sections at a fixed angle relative to each other and provides electrical communication between the sections thus joined. In an alternate installation procedure, the track sections are individually connected to the mains supply.

Both of the two mentioned installation expedients, e.g. the fixed angle junction and the separate tapping connection for each track section, present special disadvantages. In many instances, it may be desired that the tracks not be arrayed at a fixed angle of 90° relative to each other but, rather, at some lesser or greater angle. Further, since it is not feasible to provide more than a limited variety of types of connector fixtures, such non-typical installations have heretofore been possible through mounting individual unconnected tracks and effecting separate mains connections with each such track.

SUMMARY

The present invention may be summarized as directed to a flexible spanning connection adapted to be interposed between the adjacent ends of track sections to afford electrical connection to both of the sections, although only one is directly linked to a mains source. In accordance with the invention, the spanning connector comprises a pair of rigid end portions, per se of conventional design, and intended to be sleeved into the distal ends of the divergent tracks to effect a tapped electrical connection therewith. The junction portions are connected by a resilient or flexible elastomeric bendable member which may be, for example, in the form of a bellows or a length of flexible tubing, having an axially extending through-going passageway.

Two or more stiff but bendable electrical wires or conductors extend through the flexible member to link the two tapping portions of the junctions to provide electrical communication between adjacent track sections.

The device is characterized by the double function served by the stiff wires, notably to provide an electrical connection between the tracks and at the same time, by virtue of their stiffness, to maintain the flexible member at a desired configuration, whereby the same may be dressed against a wall or other surface in a neat and unobtrusive manner, and retained in position without ancillary support means.

Accordingly, it is an object of the invention to provide a flexible spanning junction for electrically connecting the distal ends of current-carrying light track conduits.

A further object of the invention is the provision of a device of the type described which may be readily caused to conform to any of a series of configurations dictated by the position of the light tracks.

Still a further object of the invention is the provision of a device of the type described wherein stiffness of the internal conductors, coupled with the flexibility or elasticity of the central spanning junction, enables the junction to be positioned and maintained in a desired orientation without the necessity for separately securing the junction assembly to a surface or surfaces between the tracks.

To attain these objects and such further objects as may appear herein or be hereinafter pointed out, reference is made to the accompanying drawings, forming a part hereof, in which:

FIG. 1 is a perspective view of the distal ends of a pair of coplanar light tracks with the flexible connection of the invention interposed therebetween, the view showing in phantom several alternative positions of the tracks;

FIG. 2 is a vertical sectional view taken on the discontinuous line 2—2 of FIG. 1;

FIGS. 3 to 5 are perspective views of different light track installations utilizing the flexible connector of the invention.

Turning now to the drawings, there is disclosed in FIG. 1 a light track installation which comprises a first track assembly 10, a second track assembly 11 and a flexible connector assembly 12 interposed between the tracks 10 and 11. The light track sections 10 and 11 may comprise extended aluminum extrusions having a longitudinally extending access aperture A (see FIGS. 3 to 5). It will be understood, as disclosed in the above-mentioned patents, that the interior of the extrusions carries an elongate vinyl or like insulating insert, which insert in turn forms a mounting for a pair of electrical conductors to be connected to a power source. Various types of tapping appliances, as illustrated in the above-referenced patents, may be inserted through the opening A (FIGS. 3 to 5) and manipulated so as to be mechanically connected to the extrusions and electrically connected to the conductors.

It is the function of the flexible connector 12 electrically and mechanically to link light track sections 10 and 11 although the sections may diverge within a relatively wide range of angular relationships.

The flexible connector assembly 12 includes first and second junction segments 13, 14, respectively, the junction segments being rigid and equipped with tapping connections, e.g. connection 15, adapted to be inserted into the free end of a light track, such as shown in U.S. Pat. No. 3,295,093. Since the tapping mechanism 15 and its function are known per se, the same will be only briefly described.

The mechanism may include a tongue portion 16 cross-sectioned to fit within a complementally formed longitudinally extending recess in the extruded track sections 10 and 11. The tapping assembly 15 includes two spring contacts, one such contact 17, being shown, which contacts, upon insertion of the tongue into the light track assembly, provide electrical connection to the conductors 18, 19 of the assembly.

Since the junction segments 13, 14 are identical, a description of one will suffice.

It will be understood that the conductors 18, 19 may be connected directly to the spring contacts or to terminal fixtures carried by the contacts.

Tongue portion 16 is provided with a through-going aperture 20 for receiving a machine screw adapted to be threaded into a track section or into a fixture carried by the track section. An insulative cover plate 21 may be mounted to the segment 13, as by machine screw 22, the shank 23 of which is received in a complementally threaded aperture 24 molded into the segment. A capping plate 25 closes the opening formed in the opposite face of the junction 13, the plate being held in position by machine screw 26 passing through integral bracket 27 and threaded into a tapped aperture in the plate 25.

A grounding lug 28 may be secured in position by the machine screw 26 for providing a common ground with the track sections 10 and 11.

The spanner assembly 12 is characterized by the provision between junction segments 13 and 14 of a flexible member 29. The flexible member, which is preferably formed of a flaccid or elastic material such as neoprene, may be substantially in the form of a bellows and is provided with grooves or corrugations G to augment the flexibility of the unit without distortion when the same is bent. The grooves G preferably extend about three of the surfaces of the perimeter of the flexible member, only the upper face 30 being ungrooved.

The member 29 includes on its opposed faces a pair of mounting grooves 31, 32, a second opposed pair of grooves 33, 34 being formed at the opposite end of the member. The grooves 31, 32 on the one hand, and 33, 34 on the other, provide an anchoring connection for end brackets 35, 36, respectively, which brackets are generally C-shaped in cross section and include inturned locking fingers 37, 38 which are seated in the grooves to maintain the brackets in position.

The brackets are provided with through-going apertures, within which are seated bushings 39 and 40. The bushings include headed portions 41, 42, respectively, and threaded portions 43, 44, respectively.

The member 29 includes an axially extending, internal bore or passageway 45 in alignment with the apertures in the bushings. Connection between the bushings and the junction segments 13, 14 is effected by threading the threaded portions of the bushings 40, 39, respectively into complementally threaded bores 46, 47, respectively molded into the end portions of the segments 13, 14.

It is important to the effective operation of the device that the conductors 18, 19 which run longitudinally through the spanning junction and are affixed at their opposite ends to the respective spring contacts 17, be stiff, bendable and relatively non-resilient. By way of example, insulated solid copper conductors of #10 or #12 gauge provide the desired combination of electrical conductivity, stiffness and shape-retention when bent.

In use, the tapping portions 15 are sleeved into the distal ends of the track sections 10, 11. In the course of insertion or thereafter, the readily bendable member 29 may be flexed so as to dress the components of the junction against the wall, ceiling or other structure to which the track sections 10, 11 are affixed.

By way of example, in FIG. 3 the track sections 10, 11 are disclosed as affixed to adjoining walls and the junction assembly 12 is mounted between the track sections and disposed in the interior corner between the walls.

In FIG. 4, sections 10, 11 are mounted at the outside junction between two walls, and thus, the junction 12, or more aptly, the flexible member is bent at a right angle to permit the section to conform to the walls.

In FIG. 5, the track section 10 is shown as secured to a ceiling and section 11 to a wall, the junction 12 in this instance extending across the dividing line between the wall and the ceiling.

It is significant to note that in the installations depicted, it is unnecessary to mount the spanner junction to the wall or ceiling since the mechanical connection between the junction and the light tracks provides ample support for the junction.

It will be readily appreciated that the angular relationship between the track sections 10, 11 need not be a perpendicular one and that the junction section is free to flex in multiple planes, whereby the track sections 10, 11 may be mounted in diverging relationship on a single planar surface or on separate planar surfaces.

It will be further understood by those skilled in the art and familiarized with the instant disclosure that variations may be made without departing from the spirit of the present invention, the salient feature of which is considered to reside in the concept of providing a spanning junction for diverging light tracks which incorporates a central, readily yieldable bellows or like yieldable construction, in combination with stiff internal conductor members, the stiffness of the conductor members being such as to retain the bellows at a selected bent configuration.

Having thus described my invention, what I claim as new and desire to secure by Letters Patent of the United States is:

1. A flexible spanner junction for electrically connecting the distal ends of diverging current-carrying light track conduits, comprising first and second rigid spaced junction segments, each said junction segment including an outer end portion having a tap portion adapted to be mechanically and electrically connected to a distal end of a light track section, and an inner end portion, a bendable section interposed between said junction segments, said bendable section including spaced end portions, each said end portion of said bendable section being fixed to an inner end portion of one of such junction segments, said bendable section being formed of yieldable elastic insulating material and including an axially extending internal passage and at least two electrical conductor members disposed within said passage and electrically connecting said tap portions of said junction segments, said conductor members being formed of stiff, bendable conductive material whereby said bendable section may be bent to any of a series of desired configurations in directions normal to the longitudinal axis thereof and will be maintained in said orientation by said bent conductors.

2. A flexible spanner junction in accordance with claim 1 wherein said bendable section is rectangular in cross section and includes a plurality of longitudinally spaced circumferential grooves extending about at least three faces of said section.

3. A light track assembly comprising first and second current-carrying light track members arrayed at an angular relation one to the other, in combination with a flexible spanner junction in accordance with claim 1, said junction electrically connecting the conductors of one said track member with the conductors of the other said member.

* * * * *